United States Patent [19]

Grove

[11] 3,883,115
[45] May 13, 1975

[54] VALVE APPARATUS FOR PIPE LINES
[75] Inventor: Marvin H. Grove, Houston, Tex.
[73] Assignee: M & J Valve Company, Houston, Tex.
[22] Filed: Sept. 14, 1973
[21] Appl. No.: 397,437

[52] U.S. Cl. .............................. 251/366; 251/329
[51] Int. Cl. ........................................... F16k 27/10
[58] Field of Search ................... 251/329, 366, 367; 29/157.1

[56] References Cited
UNITED STATES PATENTS

| | | | |
|---|---|---|---|
| 2,208,180 | 7/1940 | Delleani | 251/366 X |
| 2,904,306 | 9/1959 | Bryant | 251/367 |
| 3,000,608 | 9/1961 | Williams | 251/239 X |
| 3,170,670 | 2/1965 | Johnstone | 251/329 X |
| 3,638,908 | 2/1972 | Grove | 251/366 X |
| 3,734,461 | 5/1973 | Burger | 251/366 |
| 3,743,246 | 7/1973 | Heller | 251/329 X |

Primary Examiner—Charles J. Myhre
Assistant Examiner—Ira S. Lazarus
Attorney, Agent, or Firm—Flehr, Hohbach, Test, Albritton & Herbert

[57] ABSTRACT

Valve apparatus for pipe lines having a box-like structure which effectively protects the valve body from injury when severe bending moments are applied to the pipe sections connected to the ends of the body.

6 Claims, 7 Drawing Figures

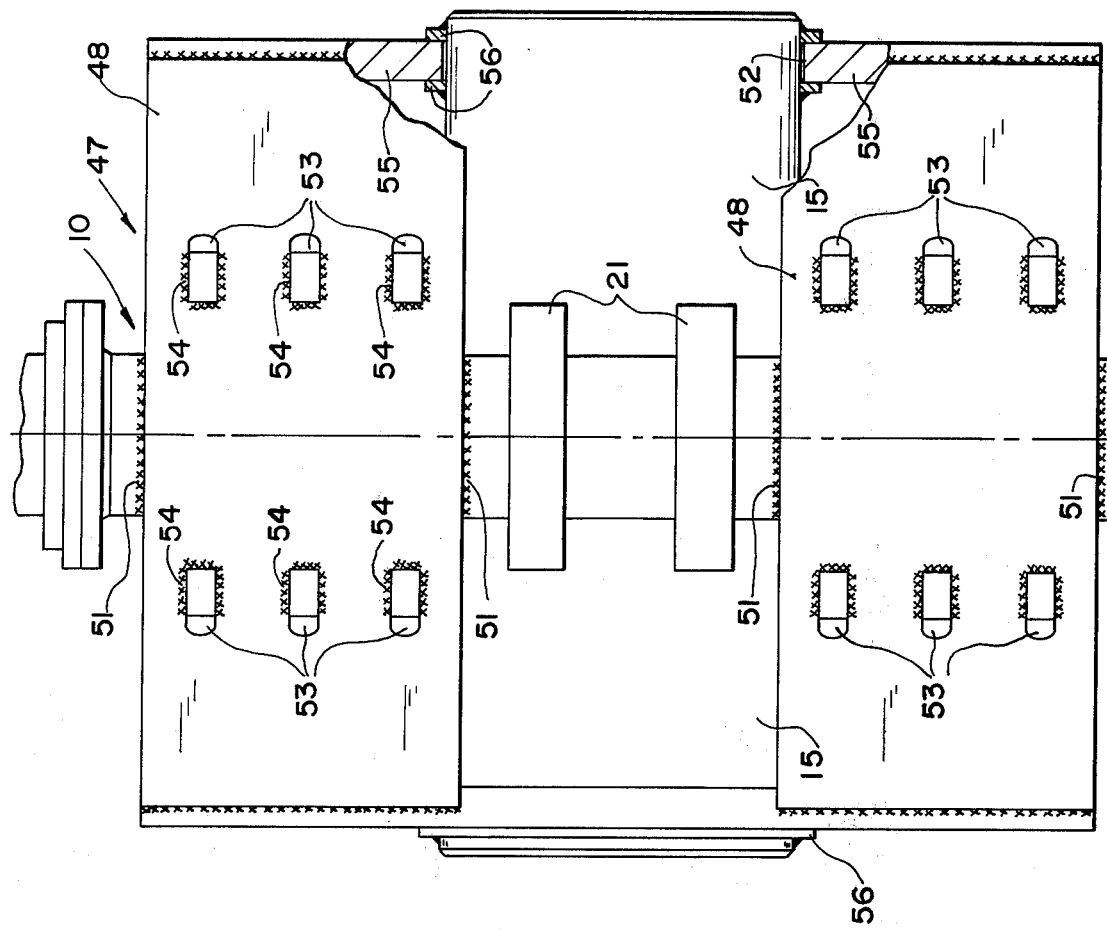
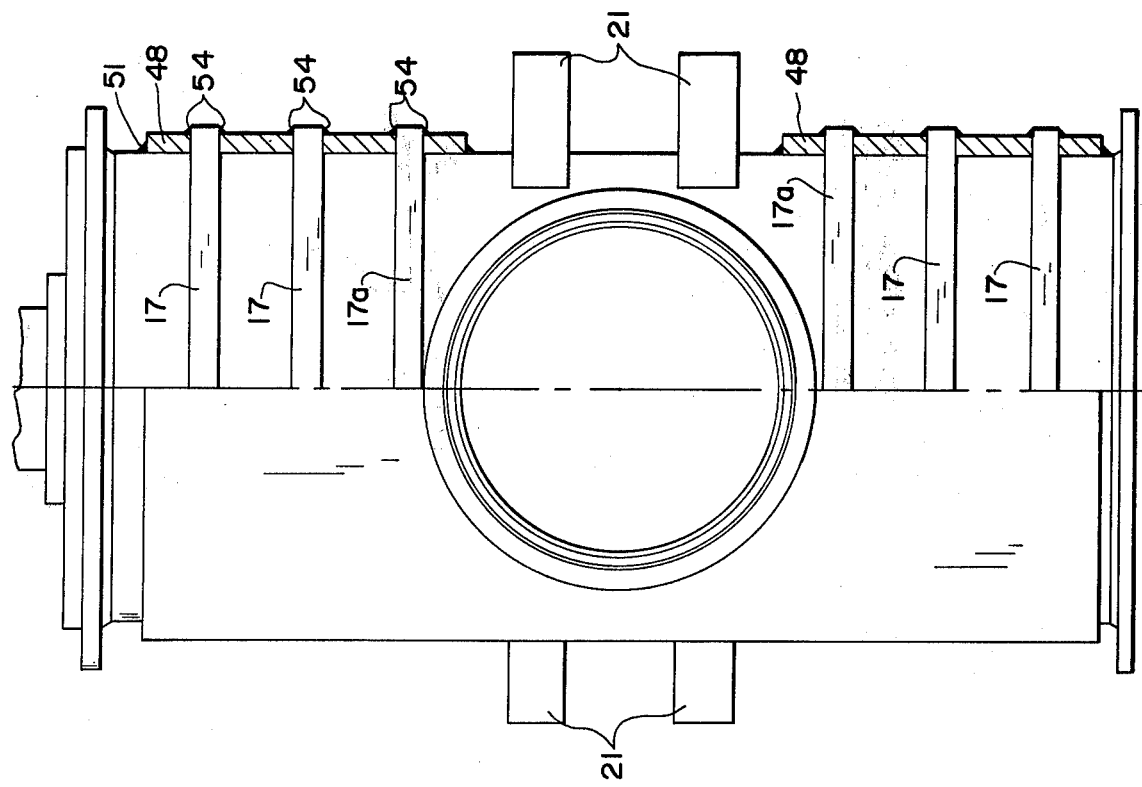

3,883,115

VALVE APPARATUS FOR PIPE LINES

BACKGROUND OF THE INVENTION

This invention relates generally to valve apparatus such as is installed in connection with pipe line transmission systems.

In the construction of pipe lines such as are used for the transmission of liquids (e.g., petroleum products) and gases (e.g., natural gas), it is customary to install valves at regular intervals which can be closed in the event of injury to the line. The valves may have either fabricated or cast steel bodies and may be of the ball or gate types. In some instances the end walls of the valve body are directly welded to adjacent sections of the pipe line, and in other instances so-called transition pieces, which are short pipe sections, are welded to the body at the factory, and subsequently the transition pieces welded in the line. In either event the valve body is secured to the upstream and downstream portions of the pipe line in such a fashion that movements of the line relative to an adjacent valve, either during or after installation, apply bending moments which cause a concentration of stress at the connection between the pipe line or transition piece and the valve body, with the result that breakage or permanent deformation may occur. After installation such forces may deflect the end walls of the body, with the result that the valve may be made inoperative due to excessive forces between the sealing assemblies and the gate or other valve member.

Various arrangements have been proposed for reinforcing the hubs or transition pieces of valve bodies. Thus U.S. Pat. No. 3,172,639 discloses use of strut-like brace members extending between the hubs and the upper and lower ends of the body. One difficulty with this type of reinforcement is that the braces do not act effectively for bending moments in all directions, and therefore they are inadequate to meet all conditions. Also bracing of this kind is not effective to cope with forces of the magnitude involved, and the points of attachment at the ends of the braces apply forces in localized regions without adequate stress distribution.

In view of the foregoing, there is a need for valve apparatus that can be installed in pipe transmission lines which will adequately withstand bending moments applied both during and after installation.

SUMMARY OF THE INVENTION

It is an object of the present invention to provide valve apparatus which is particularly adapted for use in pipe transmission lines, and which wll avoid dangerous concentration of stresses at the point of connection with the walls of the valve body.

Another object of the invention is to provide valve apparatus which is capable of handling bending moments applied in any direction, either during or after installation.

Another object of the invention is to provide valve apparatus which can be incorporated with valves of standard construction at the time the valves are installed in a pipe transmission line.

Additional objects and features of the invention will appear from the following description in which the preferred embodiments have been set forth in detail in conjunction with the accompanying drawing.

BRIEF DESCRIPTION OF THE DRAWING

FIG. 5 is a side elevational view of another embodiment of the valve apparatus, a portion being in section.

FIG. 6 is an end view of the apparatus shown in FIG. 5, with a portion being in section.

DESCRIPTION OF THE PREFERRED EMBODIMENTS

Figure 2:
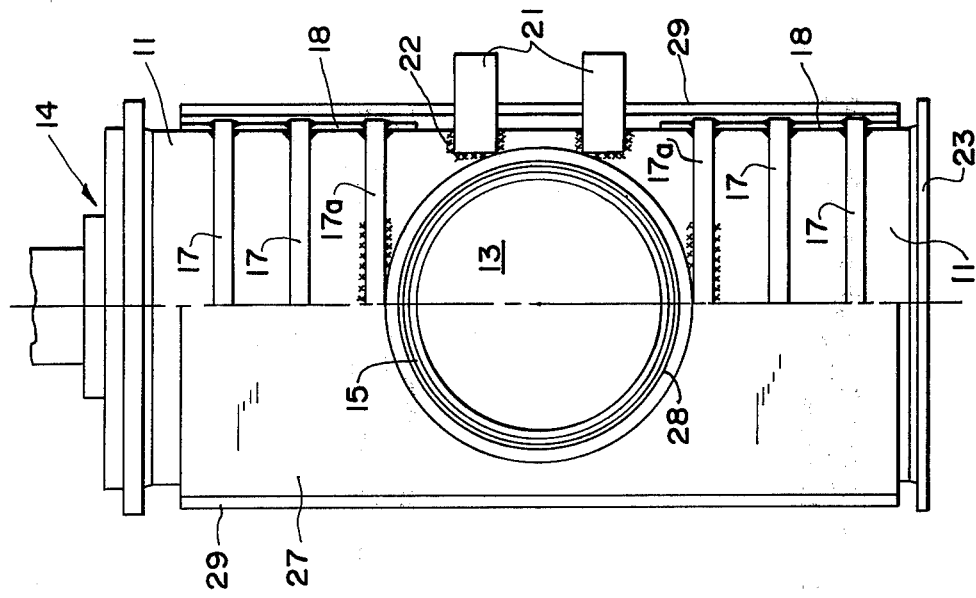
FIG. 2 is an end view of the apparatus shown in FIG. 1, with a portion being in section.
Figure 1:
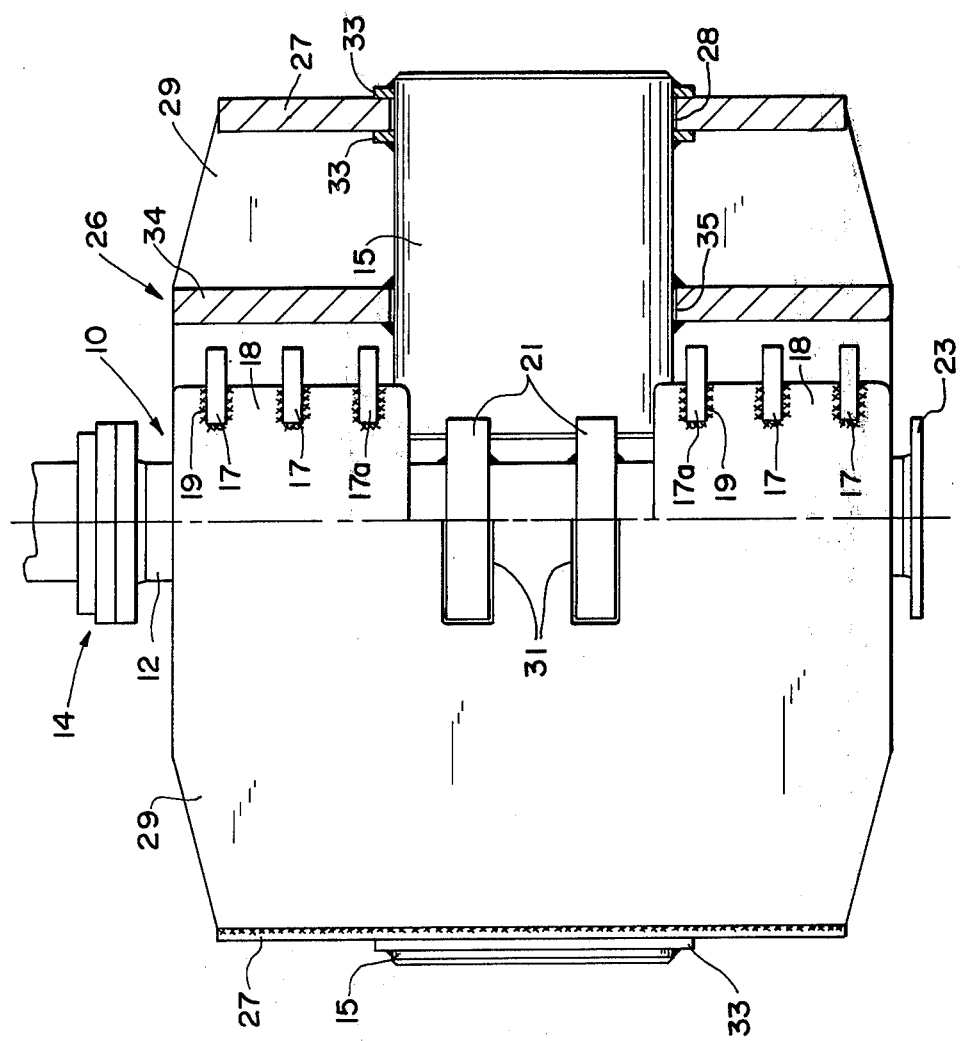
FIG. 1 is a side elevation illustrating valve apparatus incorporating the invention, a portion of the apparatus being in section.
Figure 3:
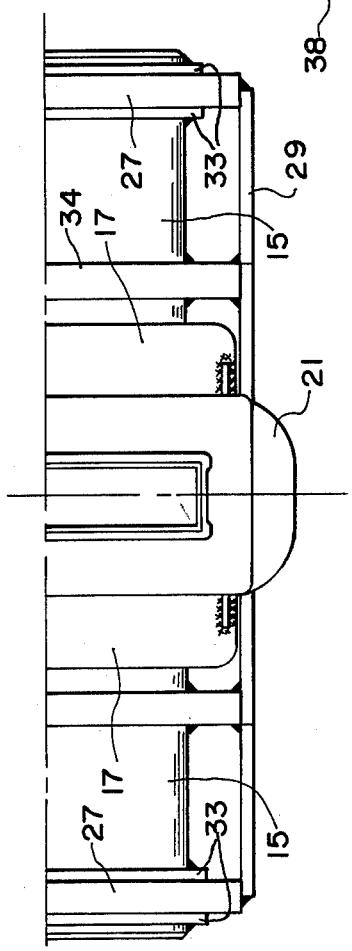
FIG. 3 is a plan view of the apparatus shown in FIG. 1.

Referring to the embodiment illustrated in FIGS. 1 – 3, it consists of a valve 10 of the gate type which can be constructed as shown in U.S. Pat. Nos. 3,481,580 or 3,638,908. More specifically, the body of such a valve can be fabricated from structural steel shapes to provide flat parallel end walls 11 welded to the side walls 12 to form a box-like structure. The end walls 11 are provided with aligned openings 13 forming fluid passages. The valve gate (not shown) within the body may be of the through-port type having a port through the same which registers with the fluid passages 13 for open valve position. The upper end of the valve body is closed by the bonnet assembly 14 and the operating rod of the valve which connects with the valve gate and extends through the bonnet assembly 14 connects with suitable valve operating means (not shown) such as a double-acting hydraulic operator of the piston-cylinder type. The transition pieces 15 are secured to the end walls 11 in communication with the flow passages 13, generally by an adequate weld connection or by use of an intervening ring which is welded to the end walls and to the adjacent end of the transition piece, in the manner disclosed in U.S. Pat. No. 3,481,580.

For the higher operating pressures it is customary to provide reinforcement for the end walls 11 of the body. Thus FIGS. 1 – 3 show reinforcement similar to that disclosed in U.S. Pat. No. 3,638,908. More particularly the ribs 17 and 17a extend across the faces of the end walls 11, and their extremities are accommodated in slots formed in the side plates 18 and secured thereto by welding 19. In addition, in the region of the transition pieces 15 the C-clamps 21 are provided which embrace the adjacent edge portions of the body and are secured thereto as by welding 22.

Assuming a through-port type of gate valve, both the upper and lower extensions of the body are provided with rib reinforcement such as described above. The bottom of the fabricated body is shown provided with the closure plate 23.

As previously explained, a gate valve as described above is susceptible to injury when relatively heavy bending moments are applied to the transition pieces 15 from the pipe sections of the line which are welded to the ends of these pieces. The stresses created by such bending forces are concentrated at the point of connection between the transition pieces and the end walls 11. Aside from the possibility of breakage at this point, such bending moments may cause some deflection of the end walls, with the result that the sealing assemblies of the valve may not function satisfactorily, or the assemblies may be jammed against the gate, thus making it impossible to operate the valve. Such bending moments may be imposed when a valve is welded into a line and then lowered into a trench or into its final operating position without proper control over forces applied to the portions of the pipe extending from the valve. After installation, severe bending moments may likewise be applied due, for example, to soil settling relative to the installed valves, or to earth movements such as may result from mild or severe earthquakes. Although the valves are generally mounted in a vertical position, the movements may be applied in varying directions, including both horizontal and vertical.

In the present invention, the stresses produced by application of such bending moments is distributed in such a fashion as to avoid breakage or injury to the valve. In the embodiment of FIGS. 1 – 3, the gate valve is enclosed within a box-like structure designated generally at 26. This consists of outer steel plates 27 which have openings 28 slightly larger in diameter than the external diameter of the transition pieces 15. The end portions of the transition pieces 15 are accommodated within the plate openings 28 and therefore surrounded by plates 27. A pair of parallel side plates 29 extend along the sides of the valve body and have their ends secured as by welding to the vertical parallel edges of the plates 27. The side plates 29 have openings 31 which are rectangular and which are dimensioned to accommodate projecting portions of the C-clamps 21. The spacing between each plate 27 and the corresponding end wall of the body should be at least about equal to the outer diameter of the transition pieces 15.

When it is desired to assemble such a box-like structure 26 about the gate valve, the outer plates 27 are positioned over the transition pieces 15 and retained thereon by suitable means such as welding or by rings 33 which are attached to the transition pieces by welding. The side plates 29 are then positioned alongside the valve body, with the C-clamps 21 accommodated within the openings 31. The ends of the side plates are then secured by welding to the outer plates 27.

In some instances it may be desirable to make use of additional intermediate plates 34 which likewise have openings 36 to accommodate the transition pieces 15. These plates can likewise be secured to the side plates 29 by welding, and can be secured by welding to the transition pieces 15 as indicated.

Assuming that valve apparatus as described above is secured to adjacent piping of a transmission line by welding the adjacent pipe line sections to the ends of the transition pieces 15, it will be evident that when bending moments are applied to the extended length of pipe and thereby applied to the transition pieces 15, the stresses created in resisting such moments are no longer concentrated at the point of connection between the transition pieces and the end walls 11. Stresses are distributed to the plates 27 and also to the plates 34 in the event they are incorporated in the structure. The plates 27 effectively resist bending moments applied between the body and the transition pieces, because these plates in turn are secured to the rigid side plates 29. Because of the box-like configuration of the structure 26, the plates 27 are likewise held in such a fashion that they resist bending moments applied to the transition pieces 15 in any direction.

As described above, the side plates 29 are not fixed to portions of the body as by welding. The entire structure 26 is carried by the transition pieces 15 and there are clearances about the C-clamps 21.

As indicated above, the plates 34 are not essential, although they provide additional means for distributing stresses when bending moments are applied.

Figure 4:
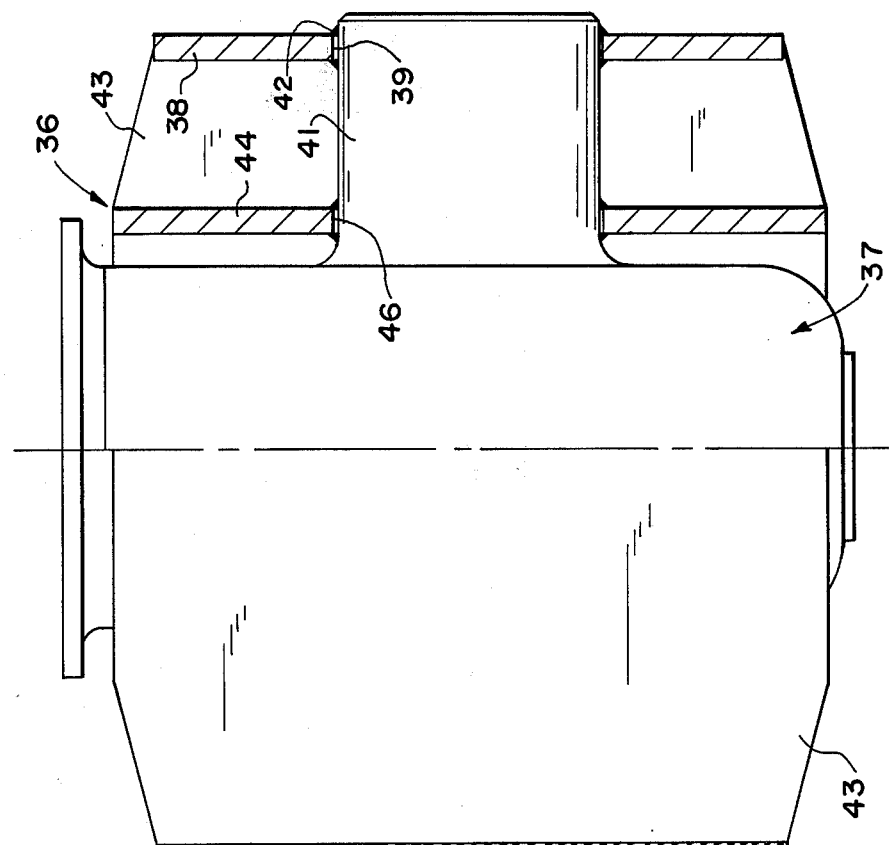
FIG. 4 is a side elevational view of another embodiment of the invention, a portion being in section.

In FIG. 4, a similar box-like structure 36 is shown incorporated with a valve 37 of the type provided with a generally cylindrical shaped body. The structure 36 in this instance consists of the outer plates 38 which have openings 39 to accommodate the body hubs 41. In this instance the plates are shown attached to the hubs by weld connections 42. The plates 43 extend along the sides of the body 37 and are secured to the vertical edges of the plates 38 by welding. Additional plates 44, corresponding to the plates 34 of FIG. 1, may also be provided. Such plates are shown with openings 46 to accommodate the hubs 41, and their side vertical edges can be secured to the plates 43 as by welding. In general, the construction shown in FIG. 4 functions in substantially the same manner as described for FIGS. 1 – 3.

Figure 7:
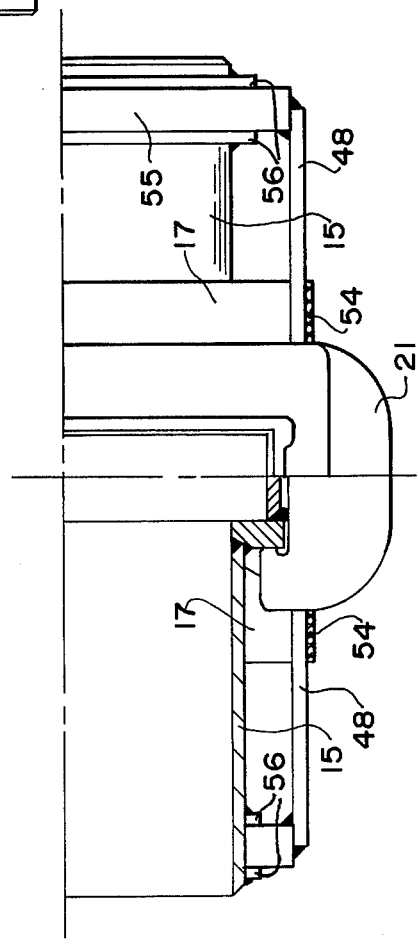
FIG. 7 is a plan view of the apparatus shown in FIG. 5, partly in section.

In the embodiment of FIGS. 5 – 7 the valve 10 is constructed in substantially the same manner as FIGS. 1 – 3. However, the box-like structure 47 makes use of upper and lower side plates 48 which form a part of the valve body, and are fixed to the side walls. Thus the plates 48 are secured to the side walls of the body as by welding 51 and take the place of the plates 31 described in U.S. Pat. No. 3,638,908. The side plates are provided with openings 53 which accommodate the extremities of the ribs 17 and 17a. In the assembly of the valve body, after the ribs 17 and 17a have been applied and the side plates 48 applied with the extremities of the ribs extending through the openings 53, the plates and rib extremities are secured together by welding 54. The transition pieces 15 are accommodated within openings formed in the outer walls 55 which are rectangular, and which have their vertical side edges secured to the corresponding edges of the side plates 48 by welding. The positioning of the outer plates 55 upon the transition pieces can be retained by rings 56 which engage the outer and inner faces of the plates 55 and are held in place by welding.

It will be evident that the embodiment of FIGS. 5 – 7 forms a completely rigid structure with the side plates 48 fixed to the side walls of the valve body. In general, the functioning of the structure shown in FIGS. 5 – 7 is the same as that described in connection with FIGS. 1 – 3.

In the embodiment of FIGS. 5 – 7, the side plates 48 perform a dual function, namely as means for anchoring the extremities of the ribs 17 and 17a, and as means for rigidly carrying the outer plates 55 which engage the transition pieces and prevent application of concentrated stresses to the connections between the transition pieces and the end walls of the valve body.

With reference to fabricated gate valves of the type shown in FIGS. 1 and 2, the spring urged seat rings are generally dimensioned to provide some lateral movement of the gate (e.g., ⅛ inch) whereby some deflection of the end walls to which the transition pieces are secured, due to forces applied to the transition pieces and connected piping, does not result in jamming of the seats against the gate or defective sealing. With such a valve it is desirable to have some flexibility in the structure 26 but with sufficient restraint being applied to prevent breaking at the connection between the transition pieces and the end walls of the valve body, when bending moments are applied up to the limits required for particular installations and well beyond the capability of the valve by itself.

I claim:

1. In valve apparatus for pipe lines, a valve body having end walls provided with flow passages, a valve member within the body and movable between open and closed positions, pipe sections or transition pieces connected to the end walls of the body and communicating with the flow passages, bonnet means carried by one end of the body, an operating rod secured to the valve member and extending through the bonnet means and supplemental means for distributing stresses produced by bending moments applied between the valve body and the pipe sections, said means including rigid and substantially rectangular structural steel plates embracing the pipe sections at regions spaced outwardly from the end walls, and parallel structural side plates disposed along the sides of the valve body and rigidly secured to parallel side edges of the first named steel plates, said structural steel plates and said structural side plates forming a rectangular prism.

2. Apparatus as in claim 1 in which the supplemental means is carried by the pipe sections and is not fixed to the valve body.

3. Apparatus as in claim 1 in which said side plates are connected to the valve body.

4. Apparatus as in claim 1 in which the valve body includes side reinforcing members and in which the side plates of the supplemental means have cutaway openings that accommodate portions of such reinforcing members.

5. Apparatus as in claim 1 in which the valve body includes reinforcing ribs extending across the end walls of the same and in which the side plates of the supplemental means having openings that accommodate the extremities of the ribs, the extremities being secured to the side plates by welding, the side plates being secured by welding to the sides of the valve body.

6. Apparatus as in claim 1 in which additional steel plates are disposed to embrace the pipe sections at regions between the first named plates and the valve body, said additional plates being rigidly secured to said side plates.

* * * * *